(12) United States Patent
Daniel

(10) Patent No.: US 11,245,431 B2
(45) Date of Patent: Feb. 8, 2022

(54) REDUCING UPLINK ACCUMULATED NOISE FLOOR IN A DISTRIBUTED COMMUNICATIONS SYSTEM (DCS)

(71) Applicant: Corning Research & Development Corporation, Corning, NY (US)

(72) Inventor: Moshe Daniel, Gedera (IL)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/917,039

(22) Filed: Jun. 30, 2020

(65) Prior Publication Data
US 2021/0409050 A1 Dec. 30, 2021

(51) Int. Cl.
*H04B 1/16* (2006.01)
*H04W 88/08* (2009.01)

(52) U.S. Cl.
CPC .............. *H04B 1/16* (2013.01); *H04W 88/085* (2013.01)

(58) Field of Classification Search
CPC .......... H04B 1/16; H04B 7/022; H04B 7/024; H04B 7/04; H04W 88/085
USPC ....................................................... 455/137
See application file for complete search history.

(56) References Cited

U.S. PATENT DOCUMENTS

| 9,276,656 | B2 | 3/2016 | Oren et al. | |
|---|---|---|---|---|
| 2014/0314061 | A1* | 10/2014 | Trajkovic | H04B 10/25754 370/338 |
| 2018/0351608 | A1* | 12/2018 | Chamarti | H04W 88/085 |
| 2020/0162131 | A1* | 5/2020 | Notargiacomo | H04B 7/0842 |

* cited by examiner

*Primary Examiner* — Lee Nguyen
(74) *Attorney, Agent, or Firm* — C. Keith Montgomery

(57) ABSTRACT

Reducing an uplink accumulated noise floor in a distributed communications system (DCS) is disclosed. The DCS includes a number of remote units that communicate a number of uplink digital communications signals to a base station concurrently. In DCSs disclosed in certain aspects herein, a signal source, such as a digital baseband unit (BBU) for example, includes multiple receiver circuits each configured to receive and decode a respective one of the uplink digital communications signals. By individually receiving and decoding the uplink digital communications signals before combining the uplink digital communications signals, each of the receiver circuits can operate with a lowered noise floor. As a result, it is possible to improve received sensitivity of the receiver circuits, thus helping to improve coverage range, spectrum efficiency, and data throughput of the DCS.

14 Claims, 11 Drawing Sheets

REDUCING UPLINK ACCUMULATED NOISE FLOOR IN A DISTRIBUTED COMMUNICATIONS SYSTEM (DCS)

BACKGROUND

The disclosure relates generally to reducing an uplink accumulated noise floor when receiving multiple uplink communications signals from multiple remote units in a distributed communications system (DCS).

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a distributed communications system (DCS) 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a distributed communications system, such as a distributed antenna system (DAS), such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Notably, each of the remote units may be configured to communicate the downlink communications signals 110(1)-110(N) in one or more frequency bands. In addition, each of the remote units may also be configured to receive uplink communications signals in one or more frequency bands.

No admission is made that any reference cited herein constitutes prior art. Applicant expressly reserves the right to challenge the accuracy and pertinency of any cited documents.

SUMMARY

Embodiments disclosed herein include reducing an uplink accumulated noise floor in a distributed communications system (DCS). The DCS includes a number of remote units that communicate a number of uplink digital communications signals to a base station concurrently. In a conventional DCS, the base station includes a single receiver and the uplink digital communications signals are summed at an input of the base station receiver. Accordingly, the base station receiver receives and decodes a summed uplink digital communications signal. Given that each remote unit can introduce a certain level of noise in a respective one of the uplink digital communications signals, the summed uplink digital communications signal can have an accumulated noise floor that is proportional to a number of the remote units in the DCS. Consequently, the base station receiver may receive the summed uplink digital communications signal with an increased total noise floor, thus degrading sensitivity of the base station receiver.

In exemplary DCSs disclosed in certain aspects herein, a signal source, such as a digital baseband unit (BBU) for example, includes multiple receiver circuits each configured to receive and decode a respective one of the uplink digital communications signals. By individually receiving and decoding the uplink digital communications signals before combining the uplink digital communications signals, each of the receiver circuits can operate with a lowered noise floor. As a result, it is possible to improve received sensitivity of the receiver circuits, thus helping to improve coverage range, spectrum efficiency, and data throughput of the DCS.

One exemplary embodiment of the disclosure relates to a DCS. The DCS includes a plurality of remote units configured to generate a plurality of first uplink digital communications signals. The DCS also includes a digital routing unit (DRU). The DRU is configured to receive the first uplink digital communications signals from the plurality of remote units. The DRU is also configured to generate a plurality of second uplink digital communications signals comprising the plurality of first uplink digital communications signals. The DCS also includes a BBU comprising a plurality of receiver circuits coupled to the DRU via a plurality of communications mediums, respectively. The plurality of receiver circuits is configured to receive the plurality of second uplink digital communications signals from the DRU. The plurality of receiver circuits is also configured to decode the plurality of second uplink digital communications signals to generate a plurality of uplink digital communications signals.

An additional exemplary embodiment of the disclosure relates to a method for reducing an uplink accumulated noise floor in a DCS. The method includes receiving, in a DRU, a plurality of first uplink digital communications signals from a plurality of remote units to a DRU. The method also includes generating, in the DRU, a plurality of second uplink digital communications signals comprising the plurality of first uplink digital communications signals. The method also includes receiving, from the DRU, the plurality of second uplink digital communications signals by a plurality of receiver circuits in a BBU. The method also includes decoding the plurality of second uplink digital communications signals to generate a plurality of uplink digital communications signals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include reducing an uplink accumulated noise floor in a distributed communications system (DCS). The DCS includes a number of remote units that communicate a number of uplink digital communications signals to a base station concurrently. In a conventional DCS, the base station includes a single receiver and the uplink digital communications signals are summed at an input of the base station receiver. Accordingly, the base station receiver receives and decodes a summed uplink digital communications signal. Given that each remote unit can introduce a certain level of noise in a respective one of the uplink digital communications signals, the summed uplink digital communications signal can have an accumulated noise floor that is proportional to a number of the remote units in the DCS. Consequently, the base station receiver may receive the summed uplink digital communications signal with an increased total noise floor, thus degrading sensitivity of the base station receiver.

In exemplary DCSs disclosed in certain aspects herein, a signal source, such as a digital baseband unit (BBU) for example, includes multiple receiver circuits each configured to receive and decode a respective one of the uplink digital communications signals. By individually receiving and decoding the uplink digital communications signals before combining the uplink digital communications signals, each of the receiver circuits can operate with a lowered noise floor. As a result, it is possible to improve received sensitivity of the receiver circuits, thus helping to improve coverage range, spectrum efficiency, and data throughput of the DCS.

Figure 1:
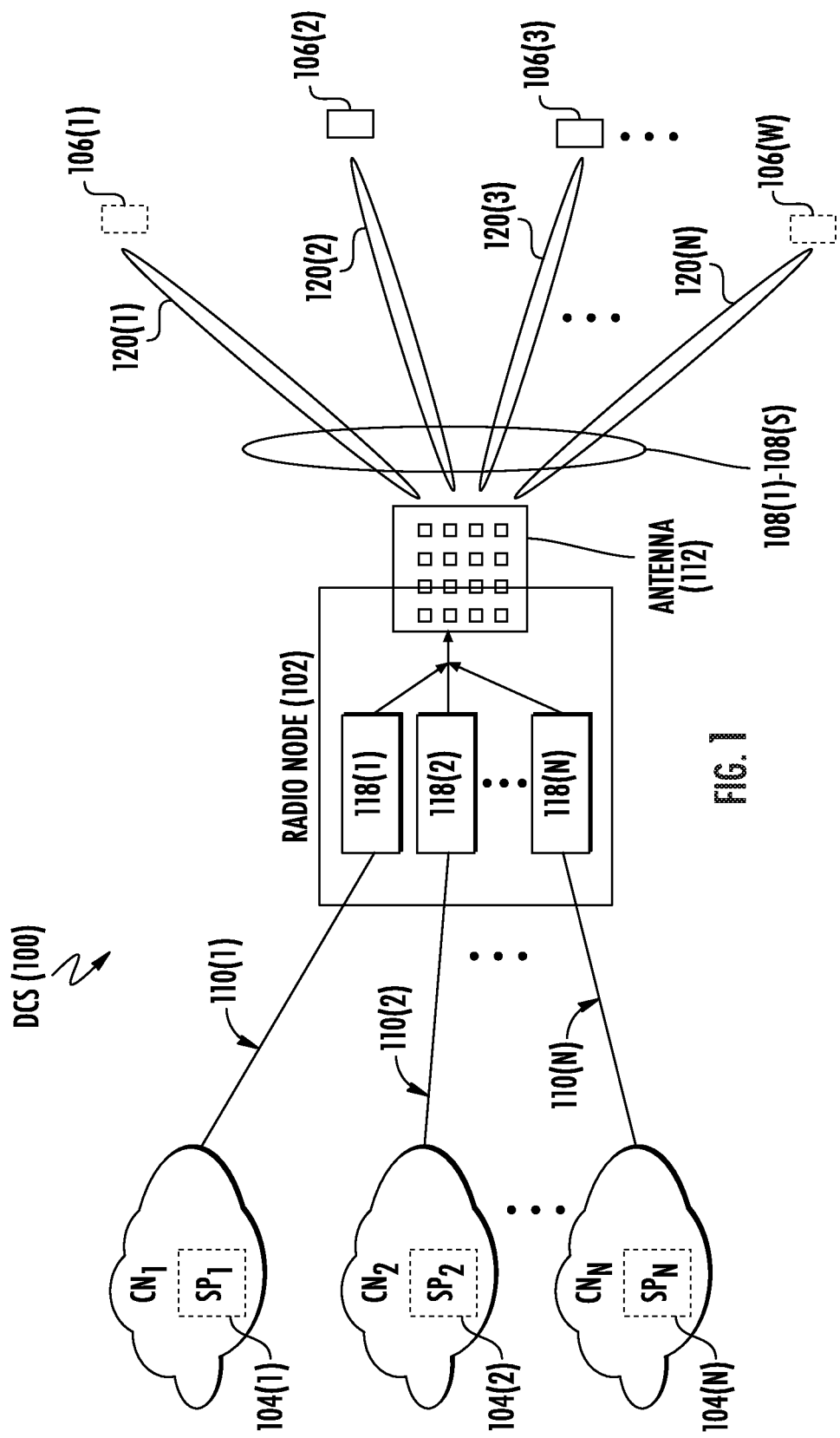
FIG. 1 is a schematic diagram of an exemplary wireless communications system (WCS), such as a distributed communications system (DCS), configured to distribute communications services to remote coverage areas.
Figure 2:
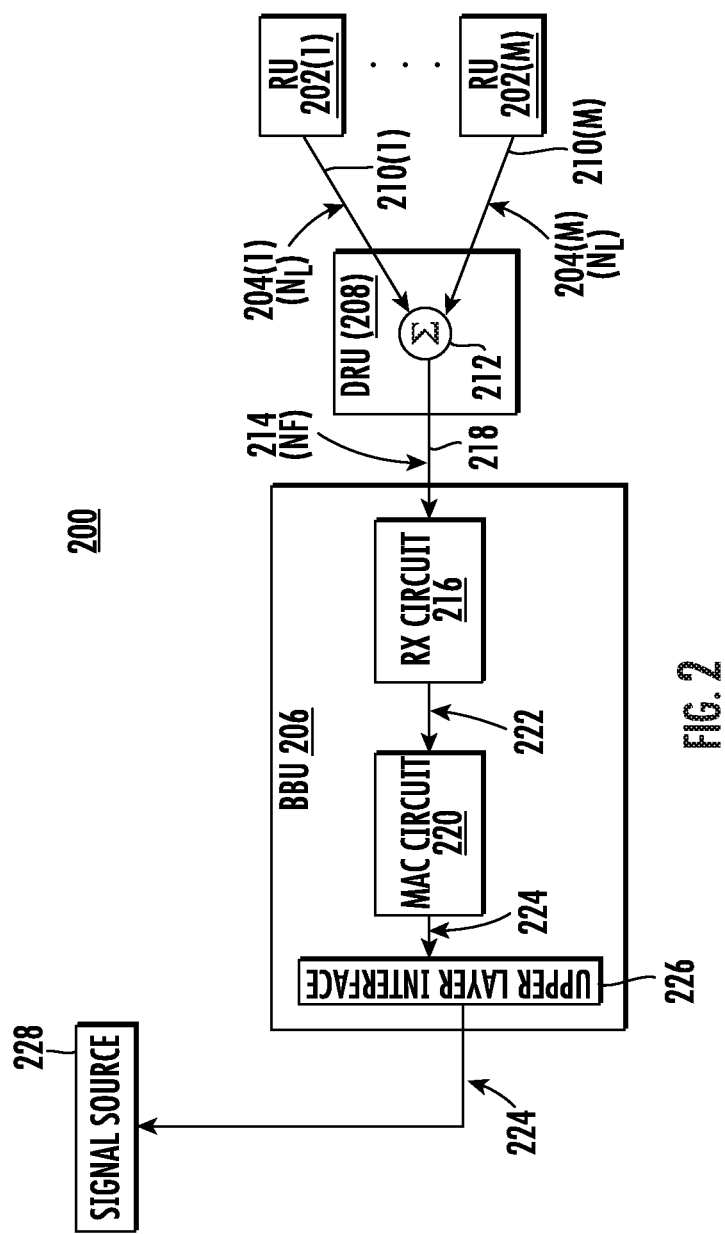
FIG. 2 is a schematic diagram of an exemplary conventional DCS that can experience an elevated uplink accumulated noise floor when a number of remote units are configured to communicate a number of uplink digital communications signals to a digital baseband unit (BBU)
Figure 3:
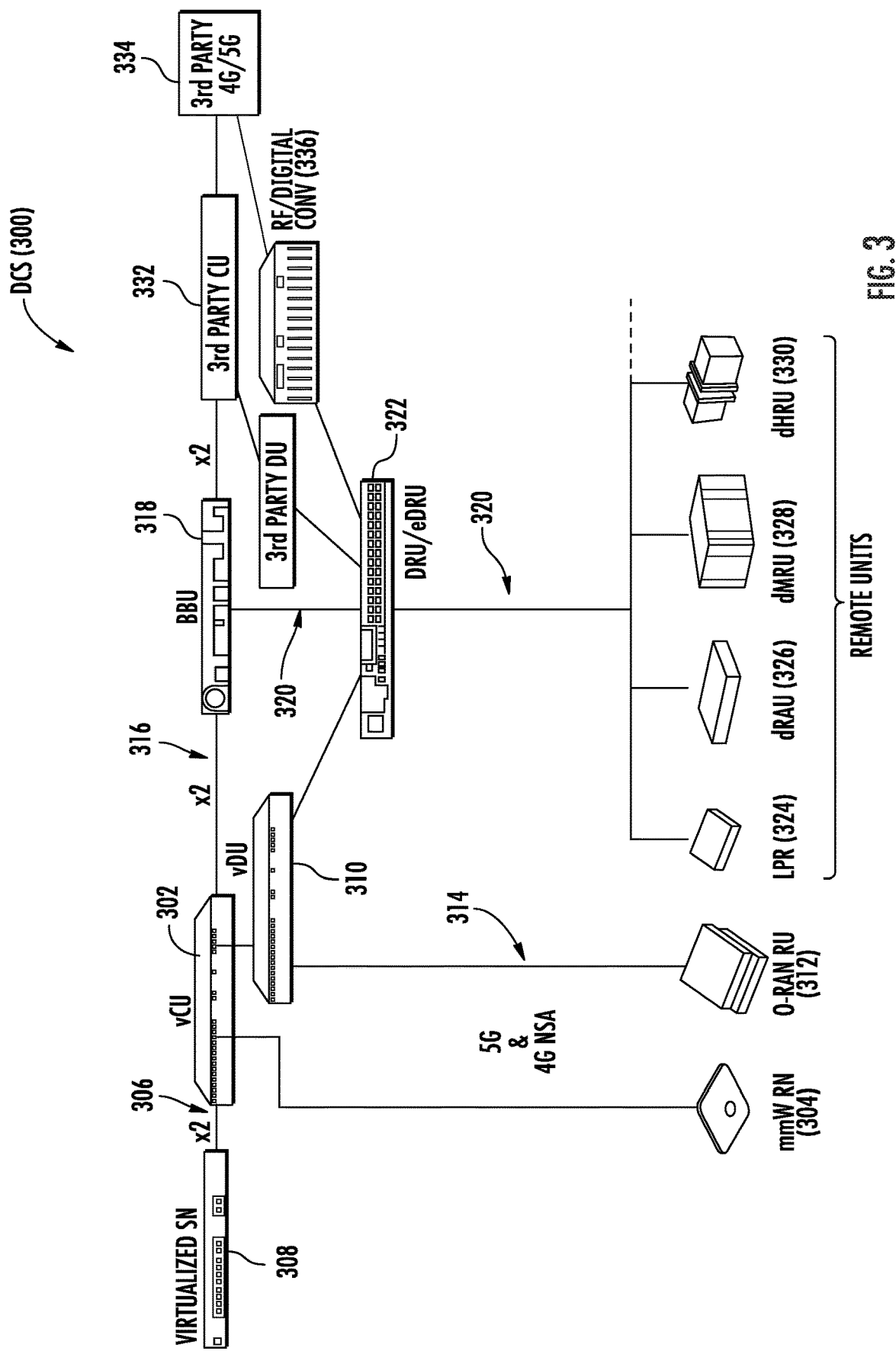
FIG. 3 is a schematic diagram of an exemplary DCS for reducing an uplink accumulated noise floor according to any of the embodiments disclosed herein.

Before discussing reducing the uplink accumulated noise floor in a DCS, starting at FIG. 3, a brief overview of a conventional DCS is first provided with reference to FIG. 2 to help understand some challenges related to uplink communications in the conventional DCS.

FIG. 2 is a schematic diagram of an exemplary conventional DCS 200 that can experience an elevated uplink accumulated noise floor NF when a plurality of remote units 202(1)-202(M) (denoted as "RU") is configured to communicate a plurality of uplink digital communications signals 204(1)-204(M) to a digital BBU 206 (denoted as "BBU"). The conventional DCS 200 includes a digital routing unit (DRU) 208. The DRU 208 is coupled to the remote units 202(1)-202(M) via a plurality of first communications mediums 210(1)-210(M), respectively. The DRU 208 includes a combiner 212 configured to combine the uplink digital communications signals 204(1)-204(M) into an uplink digital communications signal 214.

The digital BBU 206 includes a receiver circuit 216 (denoted as "RX circuit") configured to implement a physical (PHY) layer communication protocol. The receiver circuit 216 is configured to receive the uplink digital communications signal 214 via a second communications medium 218. The receiver circuit 216 is coupled to a medium access control (MAC) circuit 220, which implements a MAC layer communication protocol. The receiver circuit 216 is configured to convert the uplink digital communications signal 214 into a MAC layer uplink communications signal 222 in accordance to the MAC layer communications protocol supported by the MAC circuit 220. The MAC circuit 220 receives the MAC layer uplink communications signal 222 and further converts the MAC layer uplink communications signal 222 into an upper layer communications signal 224 in accordance to an upper layer communications protocol(s), such as Internet Protocol (IP), Transmission Control Protocol (TCP)/User Datagram Protocol (UDP), etc. The digital BBU 206 may include an upper layer interface 226 configured to receive and provide the upper layer communications signal 224 to a signal source 228.

Notably, each of the remote units 202(1)-202(M) includes electrical circuits (e.g., converter, switch, coupler, amplifier, filter, etc.) (not shown) that can introduce a certain level of noise $N_L$ into a respective one of the uplink digital communications signals 204(1)-204(M). As such, when the combiner 212 combines the uplink digital communications signals 204(1)-204(M) into the uplink digital communications signal 214, the uplink digital communications signal 214 can have the elevated accumulated noise floor NF that is proportionally related to a number of the remote units 202(1)-202(M).

For example, if the conventional DCS 200 includes thirty-two (32) of the remote units 202(1)-202(M) (M=32) and each of the remote units 202(1)-202(M) introduces a 7 dB noise into a respective one of the uplink digital communications signals 204(1)-204(M), then the accumulated noise floor NF of the uplink digital communications signal 214 can be approximately 22 dB (NF=$N_L$+10 log M=7+10 log 32). In a non-limiting example, each of the uplink digital communications signals 204(1)-204(M) is communicated with a 20 MHz channel bandwidth (BW=20 MHz) and the receiver circuit 216 is configured to receive the uplink digital communications signal 214 at a signal-to-noise ratio (SNR) threshold of 0 dB. In this regard, the receiver circuit 216 will have a receive sensitivity of approximately −79 dBm, as computed based on equation (Eq. 1) below.

$$\text{Sensitivity} = -174 \text{ dBm/Hz} + NF + SNR + 10 \log(BW) = -174 + 22 + 0 + 10 \log(32) = -79 \text{ dBm} \quad (Eq. 1)$$

In contrast, if the conventional DCS 200 only includes a single remote unit (M=1), the accumulated noise floor NF of the uplink digital communications signal 214 would be 7 dB. Accordingly, the receiver circuit 216 will have the receive sensitivity of approximately −94 dBm, as computed based on equation (Eq. 2) below.

$$\text{Sensitivity} = -174 \text{ dBm/Hz} + NF + SNR + 10 \log(BW) = -174 + 7 + 0 + 10 \log(32) = -94 \text{ dBm} \quad (Eq. 2)$$

Notably, the accumulated noise floor NF in the conventional DCS 200 configured with 32 remote units can degrade the receive sensitivity of the receiver circuit 216 by 15 dB, which can reduce coverage range of the conventional DCS 200. As a result, the remote units 202(1)-202(M) may be forced to communicate the uplink digital communications signals 204(1)-204(M) at a lower modulation and coding scheme (MCS), thus reducing overall spectrum efficiency and data throughput of the conventional DCS 200. Hence, it may be desired to reduce the accumulated noise floor NF to help improve coverage range, spectrum efficiency, and data throughput of the conventional DCS 200.

In this regard, FIG. 3 is a schematic diagram of an exemplary DCS 300 for reducing an uplink accumulated noise floor according to any of the embodiments disclosed herein. The DCS 300 supports both legacy 4G LTE, 4G/5G non-standalone (NSA), and 5G communications systems. As shown in FIG. 3, a centralized services node 302 is provided that is configured to interface with a core network to exchange communications data and distribute the communications data as radio signals to remote units. In this example, the centralized services node 302 is configured to support distributed communications services to a millimeter wave (mmW) radio node 304. The functions of the centralized services node 302 can be virtualized through an x2 interface 306 to another services node 308. The centralized services node 302 can also include one or more internal radio nodes that are configured to be interfaced with a distribution node 310 to distribute communications signals for the radio nodes to an open RAN (O-RAN) remote unit 312 that is configured to be communicatively coupled through an O-RAN interface 314.

The centralized services node 302 can also be interfaced through an x2 interface 316 to a digital BBU 318 that can provide a digital signal source to the centralized services node 302. The digital BBU 318 is configured to provide a signal source to the centralized services node 302 to provide radio source signals 320 to the O-RAN remote unit 312 as well as to a DRU 322 as part of a digital DAS. The DRU 322 is configured to split and distribute the radio source signals 320 to different types of remote units, including a lower power remote unit (LPR) 324, a radio antenna unit (dRAU) 326, a mid-power remote unit (dMRU) 328, and a high power remote unit (dHRU) 330. The digital BBU 318 is also configured to interface with a third party central unit 332 and/or an analog source 334 through an RF/digital converter 336.

In a non-limiting example, the digital BBU 318 and the DRU 322 are functionally equivalent to the digital BBU 206 and the DRU 208 in the conventional DCS 200 of FIG. 2, respectively. In addition, the LPR 324, the dRAU 326, the dMRU 328, and the dHRU 330 may be functionally equivalent to the remote units 202(1)-202(M) in the conventional DCS 200 of FIG. 2. As discussed in detail below, the digital BBU 318 can be associated with a signal source(s) and configured according to an architecture discussed below to help reduce the uplink accumulated noise floor such that the DCS 300 can provide improved coverage range, spectrum efficiency, and data throughput over the conventional DCS 200 of FIG. 2.

Figure 4:
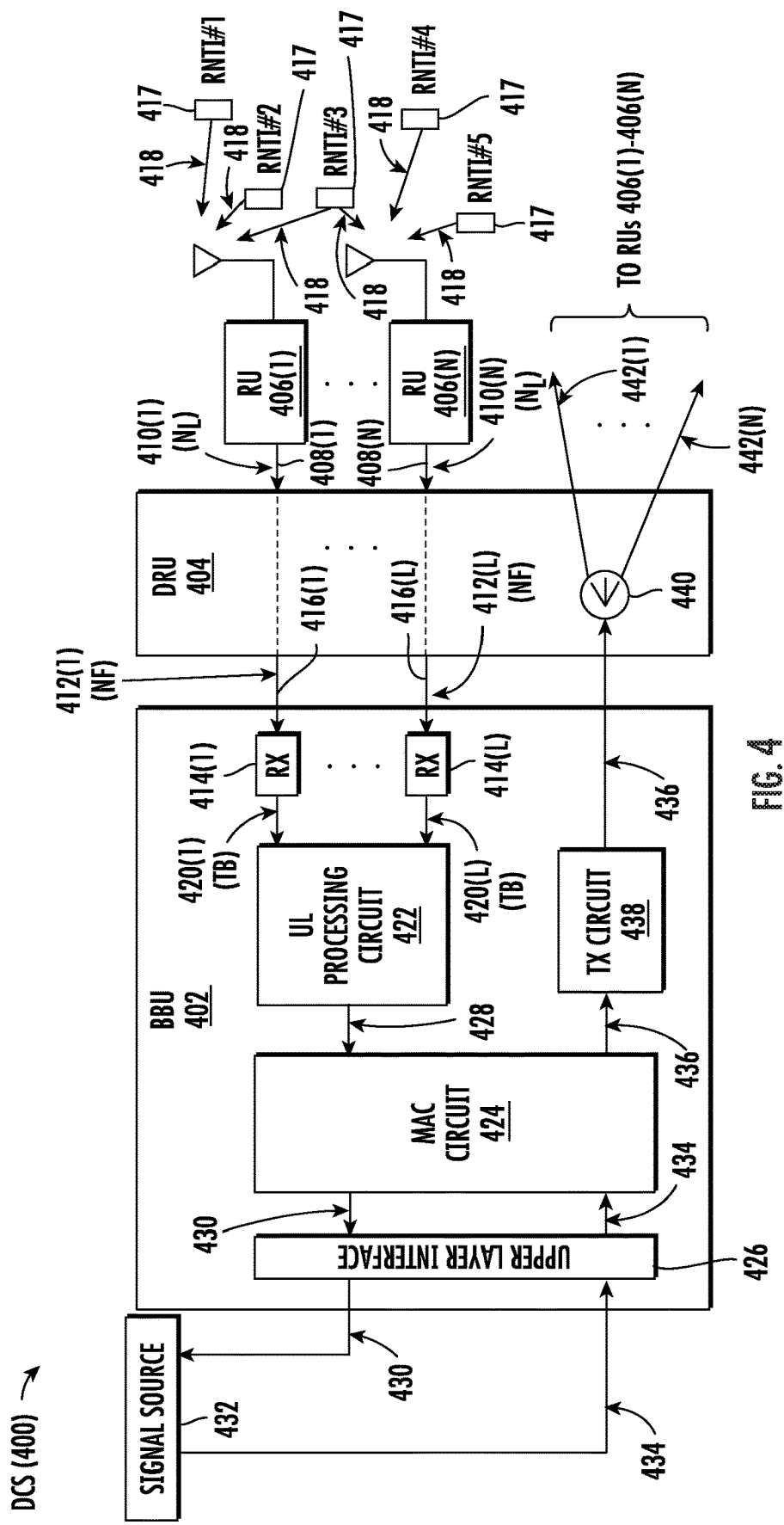
FIG. 4 is a schematic diagram of an exemplary DCS configured to reduce the uplink accumulated noise floor such that the DCS can provide improved coverage range, spectrum efficiency, and data throughput over the conventional DCS of FIG. 2.

In this regard, FIG. 4 is a schematic diagram of an exemplary DCS 400 configured to support the architecture for reducing the uplink accumulated noise floor such that the DCS 400 can provide improved coverage range, spectrum efficiency, and data throughput over the conventional DCS 200 of FIG. 2. The DCS 400 includes a digital BBU 402, a DRU 404, and a plurality of remote units 406(1)-406(N). In a non-limiting example, the digital BBU 402 is identical to the digital BBU 318 in FIG. 3, the DRU 404 is identical to the DRU 322 in FIG. 3, and the remote units 406(1)-406(N) can be any one or more of the LPR 324, the dRAU 326, the dMRU 328, and the dHRU 330 in FIG. 3. In this regard, the DCS 400 can be fully compatible and integrated with the DCS 300 of FIG. 3 to improved coverage range, spectrum efficiency, and data throughput over the conventional DCS 200 of FIG. 2.

The remote units 406(1)-406(N) are coupled to the DRU 404 via a plurality of first communications mediums 408(1)-408(N) and configured to communicate a plurality of first uplink digital communications signals 410(1)-410(N) over the first communications mediums 408(1)-408(N). In a non-limiting example, the first communications mediums 408(1)-408(N) can each be an optical fiber-based communications medium. In this regard, the remote units 406(1)-406(N) may include an electrical-to-optical (E/O) converter(s) (not shown) to convert the first uplink digital communications signals 410(1)-410(N) into optical signals and the DRU 404 may include an optical-to-electrical (O/E) converter(s) (not shown) to convert the optical signals back to the first uplink digital communications signals 410(1)-410(N). The DRU 404 generates a plurality of second uplink digital communications signals 412(1)-412(L) that includes the first uplink digital communications signals 410(1)-410(N). As discussed in detail below, each of the second uplink digital communications signals 412(1)-412(L) can include a respective one or more of the first uplink digital communications signals 410(1)-410(N).

In contrast to the digital BBU 206 in the conventional DCS 200, which includes a single receiver circuit 216, the digital BBU 402 includes a plurality of receiver circuits 414(1)-414(L) each configured to receive a respective one of the second uplink digital communications signals 412(1)-412(L) over a respective one of a plurality of second communications mediums 416(1)-416(L) (also referred to as "a plurality of communications mediums"). In a non-limiting example, the second communications mediums 416(1)-416(L) can each be an electrical communications medium (e.g., coaxial cable). In the DCS 400, there is an equal number of the first uplink digital communications signals 410(1)-410(N) and the second uplink digital communications signals 412(1)-412(L) (N=L). As such, each of the second uplink digital communications signals 412(1)-412(L) is identical to a respective one of the first uplink digital communications signals 410(1)-410(N). For example, the second uplink digital communications signal 412(1) is identical to the first uplink digital communications signal 410(1) and the second uplink digital communications signal 412(L) is identical to the first uplink digital communications signal 410(N). Accordingly, each of the receiver circuits 414(1)-414(L) in the digital BBU 402 receives a respective one of the first uplink digital communications signals 410(1)-410(N) from a respective one of the remote units 406(1)-406(N).

The DCS 400 can include a number of wireless devices 417 each uniquely identified by a respective user equipment identification, such as Radio Network Temporary Identity (RNTI). In a non-limiting example, five (5) of the wireless devices 417 are shown to be uniquely identified by RNTI#1, RNTI#2, RNTI#3, RNTI#4, and RNTI#5 and, thus, will referred interchangeably as wireless device RNTI#1, RNTI#2, RNTI#3, RNTI#4, and RNTI#5, respectively. It should be appreciated that the DCS 400 can actually support additional wireless devices without affecting configuration and operation principles of the DCS 400.

Each of the wireless devices RNTI#1, RNTI#2, RNTI#3, RNTI#4, and RNTI#5 is configured to communicate a respective uplink radio frequency (RF) communications signal 418 to one or more of the remote units 406(1)-406(N). For example, the uplink RF communications signals 418 communicated by the wireless devices RNTI#1 and RNTI#2 are only received by the remote unit 406(1), the uplink RF communications signals 418 communicated by the wireless devices RNTI#4 and RNTI#5 are only received by the remote unit 406(N), while the uplink RF communications signals 418 communicated by the wireless devices RNTI#3 is received by both the remote unit 406(1) and the remote unit 406(N). The remote units 406(1)-406(N) each include an analog-to-digital converter (ADC) (not shown) for converting a respective one of the uplink RF communications signals 418 into a respective one of the first uplink digital communications signals 410(1)-410(N). Notably, each of the remote units 406(1)-406(N) can also include other electrical circuits (e.g., switch, coupler, amplifier, filter, etc.) for receiving and/or processing the respective one of the uplink RF communications signals 418. As such, each of the remote units 406(1)-406(N) can also introduce a noise $N_L$ in the respective one of the first uplink digital communications signals 410(1)-410(N).

In a non-limiting example, each of the remote units 406(1)-406(N) is configured to communicate the first uplink digital communications signals 410(1)-410(N) in a 20 MHz channel bandwidth (BW=20 MHz) and can introduce the noise $N_L$ at 7 dB. However, since each of the receiver circuits 414(1)-414(L) only receives one of the first uplink digital communications signals 410(1)-410(N) from one of the remote units 406(1)-406(N), each of the receiver circuits 414(1)-414(L) will have a respective receive sensitivity NF as determined in the equation (Eq. 2) above. In this regard, the receive sensitivity NF of each of the receiver circuits 414(1)-414(L) will only depend on the noise $N_L$ introduced by the respective one of the remote units 406(1)-406(N). In other words, the receive sensitivity NF of the receiver circuits 414(1)-414(L) is no longer proportionally related to a number of the remote units 406(1)-406(N) in the DCS 400. As a result, it is possible to improve receive sensitivity of the receiver circuits 414(1)-414(L), thus helping to improve coverage range, spectrum efficiency, and data throughput of the DCS 400.

Figure 5:
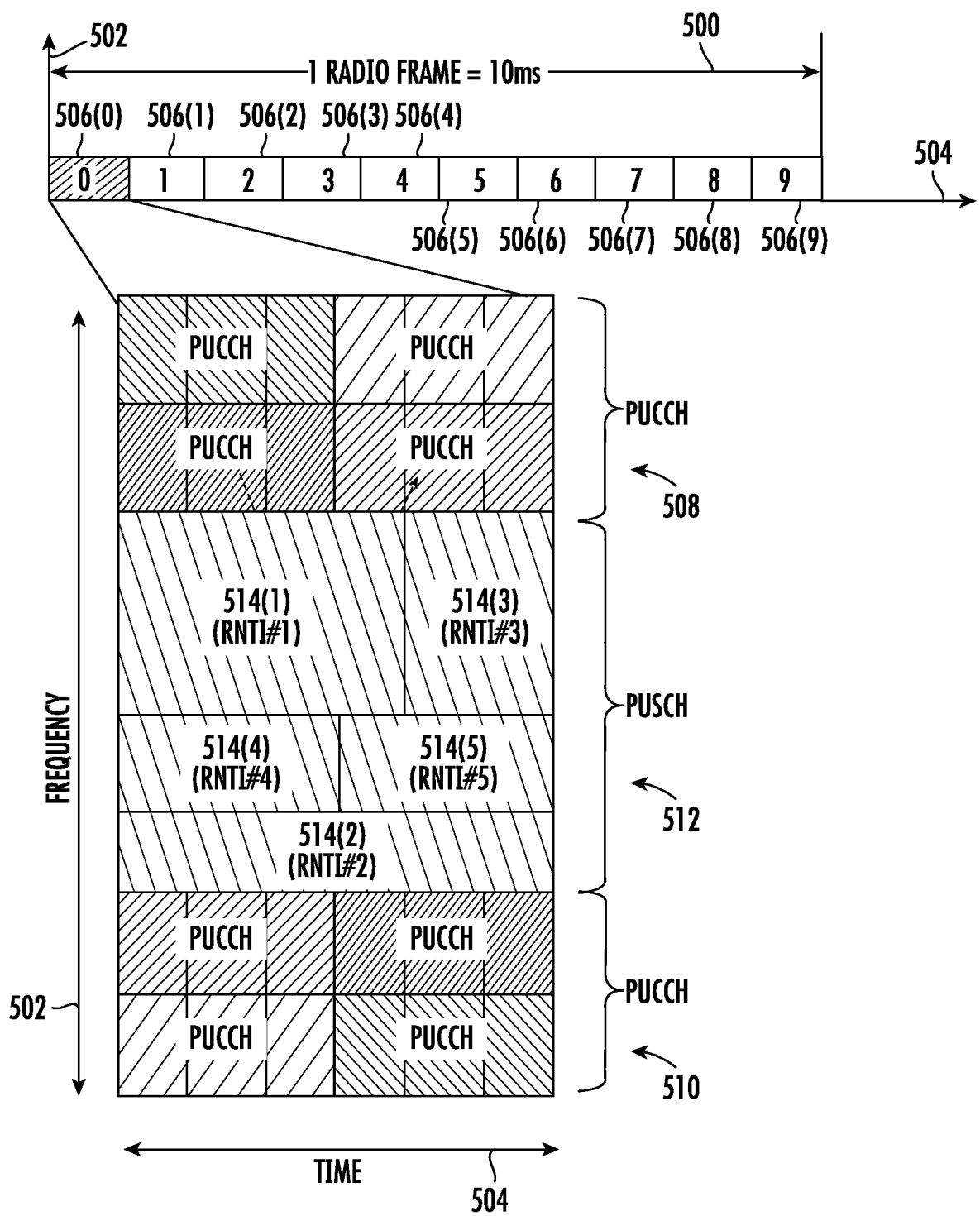
FIG. 5 is a block diagram providing an exemplary illustration of a physical uplink resource allocation(s) for communication of a number of uplink radio frequency (RF) communications signals in the DCS of FIG. 4.

The wireless devices RNTI#1, RNTI#2, RNTI#3, RNTI#4, and RNTI#5 can be configured to communicate the uplink RF communications signals 418 based on physical uplink resource allocations, for example, in the Physical Uplink Shared Channel (PUSCH). In this regard, FIG. 5 is a block diagram providing an exemplary illustration of a number of physical uplink resource allocations for the wireless devices 417 to communicate the uplink RF communications signals 418 to the remote units 406(1)-406(N) in the DCS 400 of FIG. 4.

In wireless communications systems such as Long-Term Evolution (LTE) and Fifth-Generation New Radio (5G-NR), each of the uplink RF communications signals 418 is communicated based on a radio frame(s) 500. The radio frame(s) 500 occupies a number of subcarriers in a frequency domain 502 and lasts ten microseconds (10 ms) in a time domain 504. The radio frame(s) 500 is equally divided into ten (10) subframes 506(0)-506(9). Each of the subframes 506(0)-506(9) occupies a same number of subcarriers in the frequency domain 502 and lasts one millisecond (1 ms) in the time domain 504. In a time-division duplex (TDD) system, the subframes 506(0)-506(9) in the radio frame(s) 500 can be allocated for both downlink and uplink communications based on a predetermined downlink-uplink ratio. In contrast, in a frequency-division duplex (FDD) system, all of the subframes 506(0)-506(9) in the radio frame(s) 500 can be allocated for either downlink or uplink communication.

For example, the subframe 506(0) is allocated for uplink communication. The subframe 506(0) is further divided into two control regions 508 and 510, which are occupied by the Physical Uplink Control Channel (PUCCH), and a data region 512 that is occupied by the PUSCH. The data region 512 may be divided into 5 transport blocks (TBs) 514(1)-514(5) and allocated to the wireless devices RNTI#1, RNTI#2, RNTI#3, RNTI#4, and RNTI#5, respectively. Accordingly, each of the wireless devices RNTI#1, RNTI#2, RNTI#3, RNTI#4, and RNTI#5 communicates a respective one of the uplink RF communications signals 418 in a respective one of the transport blocks (TBs) 514(1)-514(5).

With reference back to FIG. 4, the remote units 406(1)-406(N) convert the uplink RF communications signals 418 into the first uplink digital communications signals 410(1)-410(N) that include the TBs 514(1)-514(5). In this regard, the receiver circuits 414(1)-414(L) will also receive the second uplink digital communications signals 412(1)-412(L) that include the TBs 514(1)-514(5). Accordingly, the receiver circuits 414(1)-414(L) can decode the second uplink digital communications signals 412(1)-412(L) to generate a plurality of uplink digital communications signals 420(1)-420(L). Notably, each of the uplink digital communications signals 420(1)-420(L) can include the TBs 514(1)-514(5) that correspond to one of more of the user equipment identifications RNTI#1, RNTI#2, RNTI#3, RNTI#4, and RNTI#5.

Figure 6:
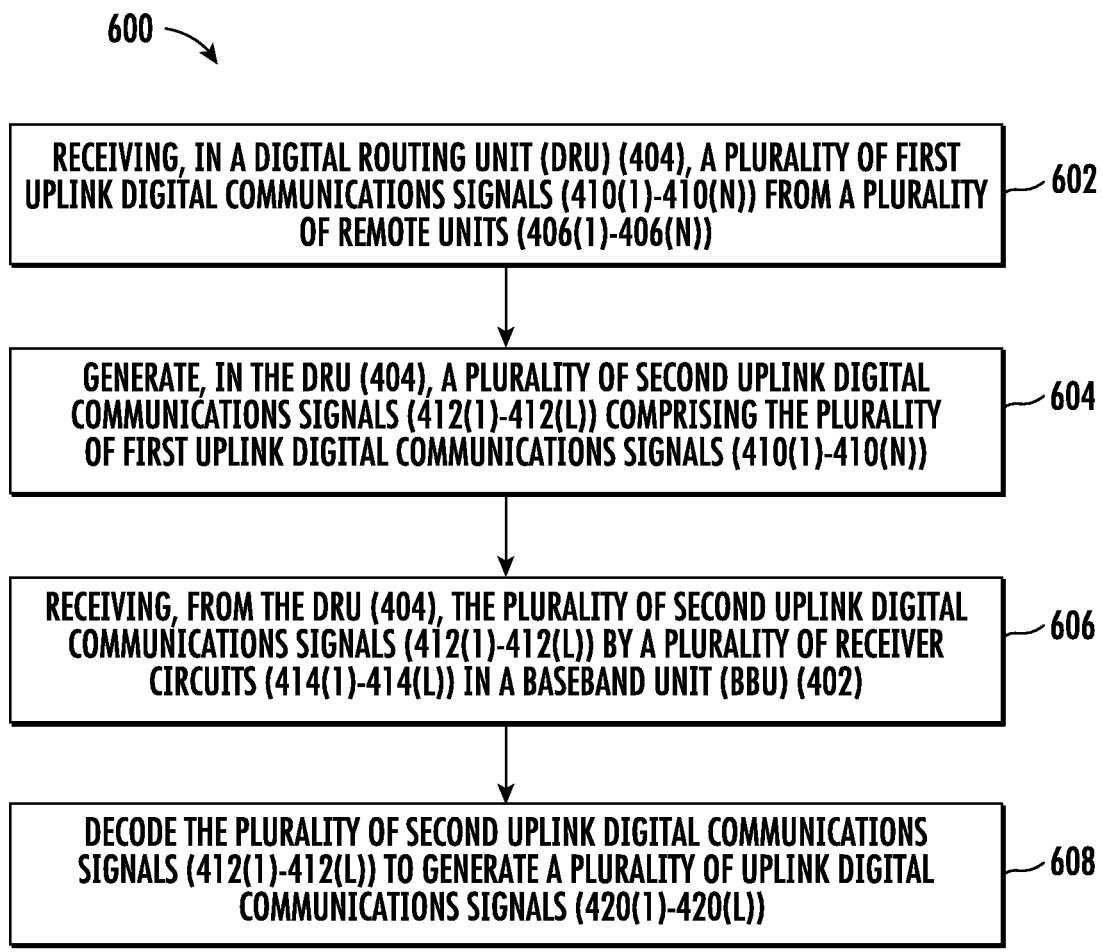
FIG. 6 is a flowchart of an exemplary process that may be employed by the DCS of FIG. 4 for reducing the uplink accumulated noise floor.

The DCS 400 may be configured to reduce the uplink accumulated noise floor based on a process. In this regard, FIG. 6 is a flowchart of an exemplary process 600 that may be employed by the DCS 400 of FIG. 4 for reducing the uplink accumulated noise floor.

The process 600 includes receiving, in the DRU 404, the first uplink digital communications signals 410(1)-410(N) from the remote units 406(1)-406(N) (block 602). The process 600 also includes generating, in the DRU 404, the second uplink digital communications signals 412(1)-412(L) comprising the first uplink digital communications signals 410(1)-410(N) (block 604). The process 600 also includes receiving, from the DRU 404, the second uplink digital communications signals 412(1)-412(L) by the receiver circuits 414(1)-414(L) in the digital BBU 402 (block 606). The process 600 further includes decoding the second uplink digital communications signals 412(1)-412(L) to generate the uplink digital communications signals 420(1)-420(L) (block 608).

With reference back to FIG. 4, the digital BBU 402 also includes an uplink processing circuit 422, a MAC circuit 424, and an upper layer interface 426. The uplink processing circuit 422, which can be implemented as a field-programmable gate array (FPGA), a system on chip (SoC), or a system in package (SiP), for example, is coupled between the MAC circuit 424 and the receiver circuits 414(1)-414(L). The uplink processing circuit 422 receives the uplink digital communications signals 420(1)-420(L) from the receiver circuits 414(1)-414(L), respectively. The uplink processing circuit 422 is configured to process the uplink digital communications signals 420(1)-420(L) to generate an uplink digital communications signal 428 that includes all the TBs, such as the TBs 514(1)-514(5), associated with each of the uplink digital communications signals 420(1)-420(L).

Notably, the MAC circuit 424 can implement a MAC layer protocol that requires a predefined protocol format. In this regard, when generating the uplink digital communications signal 428, the uplink processing circuit 422 may arrange the TBs received from the uplink digital communications signals 420(1)-420(L) into the predefined protocol format as required by the MAC circuit 424.

As previously mentioned, each of the wireless devices RNTI#1, RNTI#2, RNTI#3, RNTI#4, and RNTI#5 can communicate the respective uplink RF communications signals 418 to more than one of the remote units 406(1)-406(N). For example, the uplink RF communications signals 418 communicated by the wireless devices RNTI#3 can be received by both the remote unit 406(1) and the remote unit 406(N). As such, the first uplink digital communications signals 410(1) and 410(N) can both include the TB 514(3) as shown in FIG. 5. Accordingly, both the second uplink digital communications signals 412(1) and 412(N) will also include the TB 514(3). In this regard, the uplink processing circuit 422 can be further configured to process the second uplink digital communications signals 412(1)-412(L) to eliminate at least one duplicated TB (e.g., the TB 514(3) in the second uplink digital communications signal 412(N)) associated with at least one user equipment identification (e.g., RNTI#3).

The MAC circuit 424 receives the uplink digital communications signal 428 from the uplink processing circuit 422 and further converts the uplink digital communications signal 428 into an upper layer uplink communications signal 430 in accordance to an upper layer communications protocol(s), such as IP, TCP/UDP, etc. The upper layer interface 426 is configured to receive and provide the upper layer uplink communications signal 430 to a signal source 432 (e.g., a base station, a BBU, etc.).

The upper layer interface 426 is further configured to receive an upper layer downlink communications signal 434 from the signal source 432. The MAC circuit 424 is further configured to convert the upper layer downlink communications signal 434 into a downlink digital communications signal 436. The digital BBU 402 further includes a transmitter circuit 438 configured to provide the downlink digital communications signal 436 to the DRU 404. The DRU 404 includes a splitter 440 coupled to the remote units 406(1)-406(N). The splitter 440 is configured to split the downlink digital communications signal 436 into a plurality of downlink digital communications signals 442(1)-442(N). Each of the downlink digital communications signals 442(1)-442(N) includes the downlink digital communications signal 436. The splitter 440 provides each of the downlink digital communications signals 442(1)-442(N) to a respective one of the plurality of remote units 406(1)-406(N).

Figure 7:
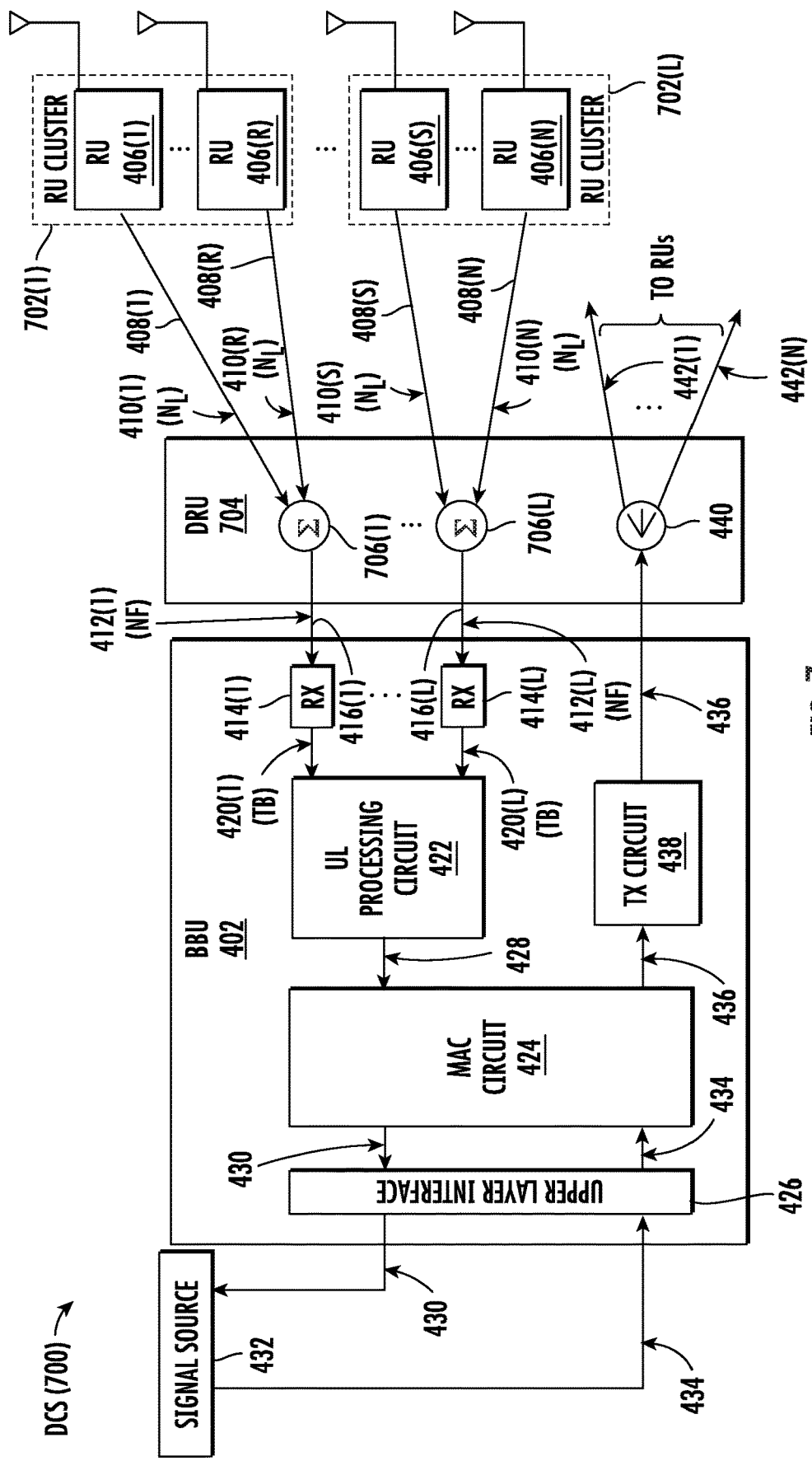
FIG. 7 is a schematic diagram of an exemplary DCS configured according to another embodiment of the present disclosure for reducing the uplink accumulated noise floor.

In the DCS 400, there is a one-to-one relationship between the receiver circuits 414(1)-414(L) in the digital BBU 402 and the remote units 406(1)-406(N). Accordingly, each of the receiver circuits 414(1)-414(L) is coupled to a respective one of the remote units 406(1)-406(N). Notably, it is also possible to couple each of the receiver circuits 414(1)-414(L) to more than one of the remote units 406(1)-406(N). In this regard, FIG. 7 is a schematic diagram of an exemplary DCS 700 configured according to another embodiment of the present disclosure to support the architecture for reducing an uplink accumulated noise floor. Common elements between FIGS. 4 and 7 are shown therein with common element numbers and will not be re-described herein.

In the DCS 700, the remote units 406(1)-406(N) may be organized into a plurality of remote unit clusters 702(1)-702(L) (L≤N). Each of the remote unit clusters 702(1)-702(L) represents a subset of one or more of the remote units 406(1)-406(N). Accordingly, each of the remote unit clusters 702(1)-702(L) communicates one or more of the first uplink digital communications signals 410(1)-410(N). For example, the remote unit cluster 702(1) includes remote units 406(1)-406(R) (R<N) and communicates the first uplink digital communications signals 410(1)-410(R). The remote unit cluster 702(L) includes remote units 406(S)-406(N) (R<S≤N) and communicates the first uplink digital communications signals 410(S)-410(N).

The DCS 700 includes a DRU 704, which is coupled between the receiver circuits 414(1)-414(L) in the digital BBU 402 and the remote unit clusters 702(1)-702(L). In a non-limiting example, the DRU 704 includes a plurality of combiners 706(1)-706(L) each coupled between a respective one of the receiver circuits 414(1)-414(L) and a respective one of the remote unit clusters 702(1)-702(L). In this regard, there is a one-to-one relationship between the receiver circuits 414(1)-414(L) and the remote unit clusters 702(1)-702(L). Given that each of the remote unit clusters 702(1)-702(L) can include more than one of the remote units 406(1)-406(N), there can be a one-to-many relationship between the receiver circuits 414(1)-414(L) and the remote units 406(1)-406(N).

The combiners 706(1)-706(L) in the DRU 704 receive the first uplink digital communications signals 410(1)-410(N) from the remote units 406(1)-406(N) in the remote unit clusters 702(1)-702(L). Each of the combiners 706(1)-706(L) combines one or more of the first uplink digital communications signals 410(1)-410(N), which are received from a respective one of the remote unit clusters 702(1)-702(L), to generate a respective one of the second uplink digital communications signals 412(1)-412(L). Accordingly, each of the receiver circuits 414(1)-414(L) in the digital BBU 402 receives a respective one of the second uplink digital communications signals 412(1)-412(L) from a respective one of the combiners 706(1)-706(L).

Figure 8:
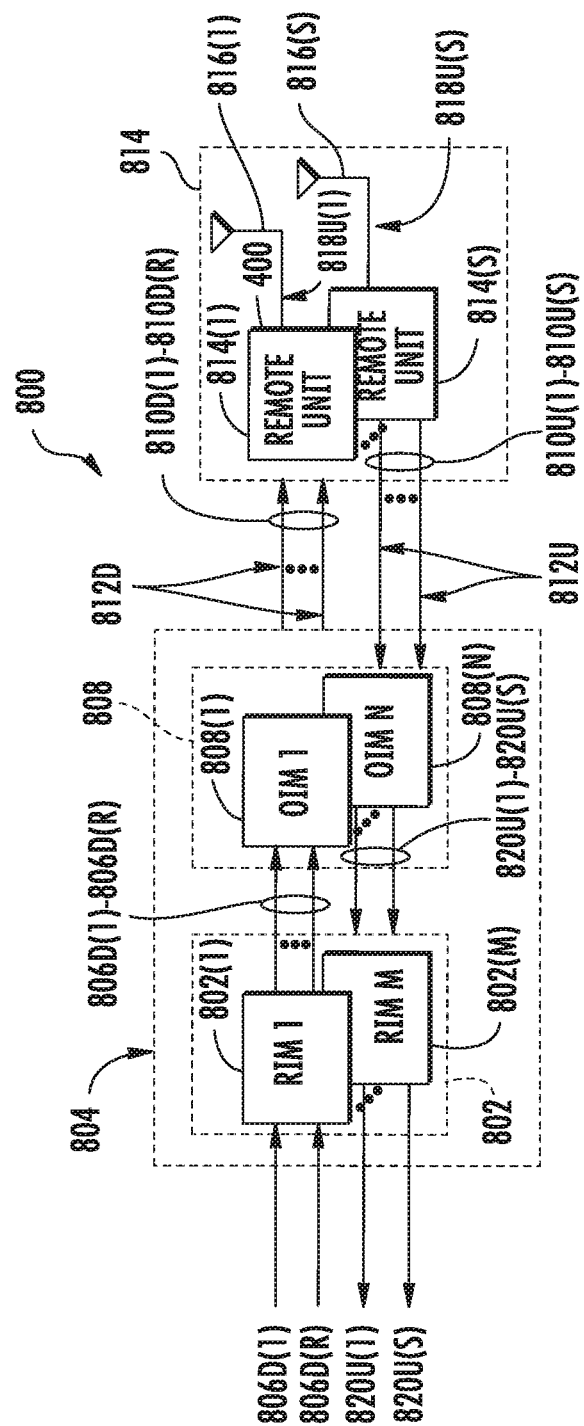
FIG. 8 is a schematic diagram of an exemplary WCS provided in the form of an optical fiber-based WCS, such as the DCS of FIGS. 4 and 7 for reducing the uplink accumulated noise floor.

FIG. 8 is a schematic diagram of an exemplary WCS 800 provided in the form of an optical fiber-based WCS, such as the DCS 400 of FIG. 4 or the DCS 700 of FIG. 7 for reducing the uplink accumulated noise floor. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink communications signals 806D(1)-806D(R) prior to optical conversion into downlink optical fiber-based communications signals. The downlink communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each of the RIMs 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMs 802(1)-802(M), the central unit 804 could be configured to support and distribute communications signals on both PCS and Long-Term Evolution (LTE) 700 radio bands, as an example. The RIMs 802(1)-802(M) may be provided in the central unit 804 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 802(1)-802(M) may also be provided in the central unit 804 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink communications signals 806D(1)-806D(R) are provided to a plurality of optical interfaces provided in the form of optical interface modules (OIMs) 808(1)-808(N) in this embodiment to convert the downlink communications signals 806D(1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N)

support the radio bands that can be provided by the RIMs 802(1)-802(M), including the examples previously described above.

The OIMs 808(1)-808(N) each include E/O converters to convert the downlink communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). The notation "1-S" indicates that any number of the referenced component 1-S may be provided. Remote unit O/E converters provided in the remote units 814(1)-814(S) convert the downlink optical fiber-based communications signals 810D(1)-810D(R) back into the downlink communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink communications signals 818U(1)-818U(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium.

Figure 9:
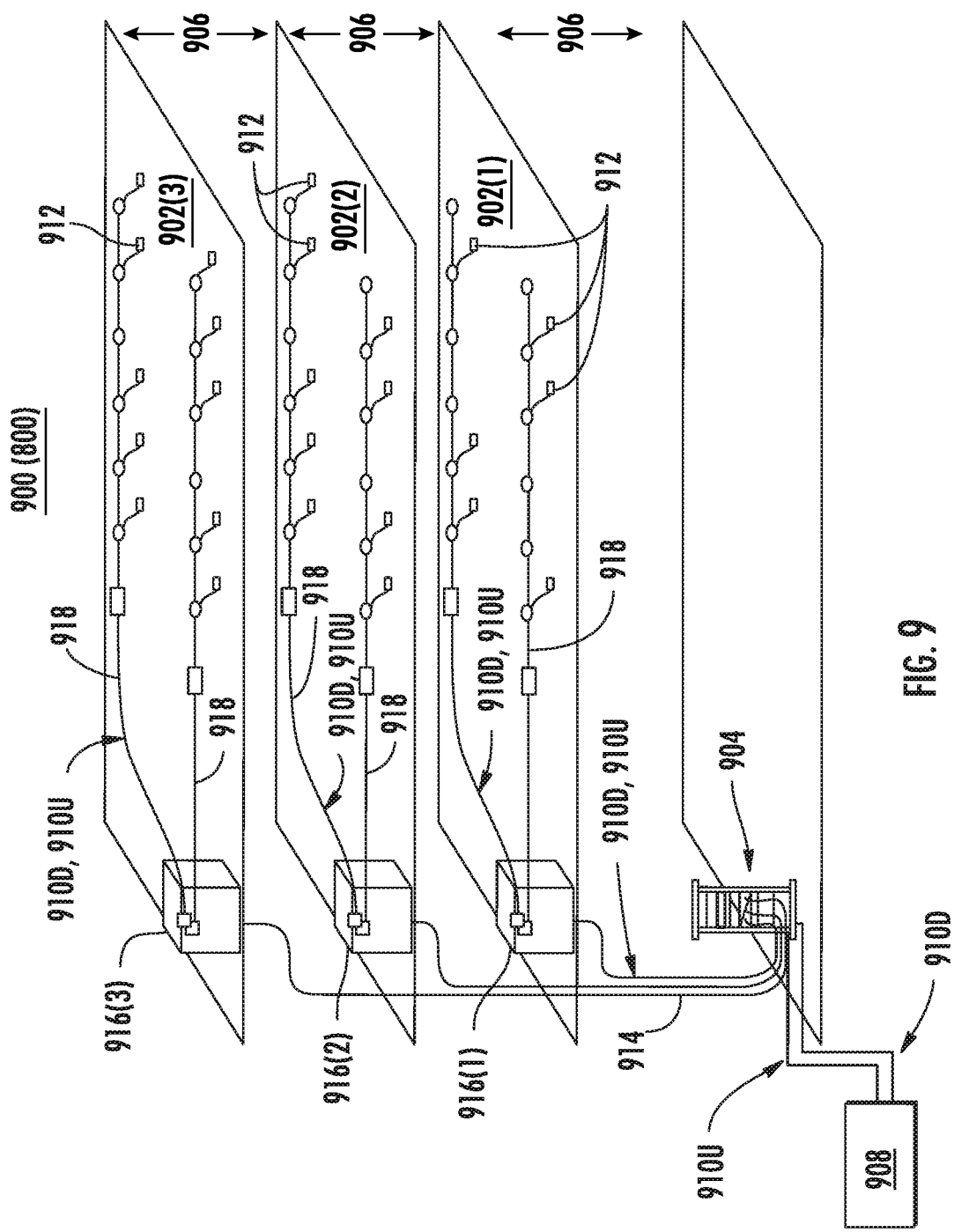
FIG. 9 is a partial schematic cut-away diagram of an exemplary building infrastructure in a WCS, such as the WCS of FIG. 8.

The WCS 800 in FIG. 8 can be provided in an indoor environment as illustrated in FIG. 9. FIG. 9 is a partial schematic cut-away diagram of an exemplary building infrastructure 900 in a WCS, such as the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
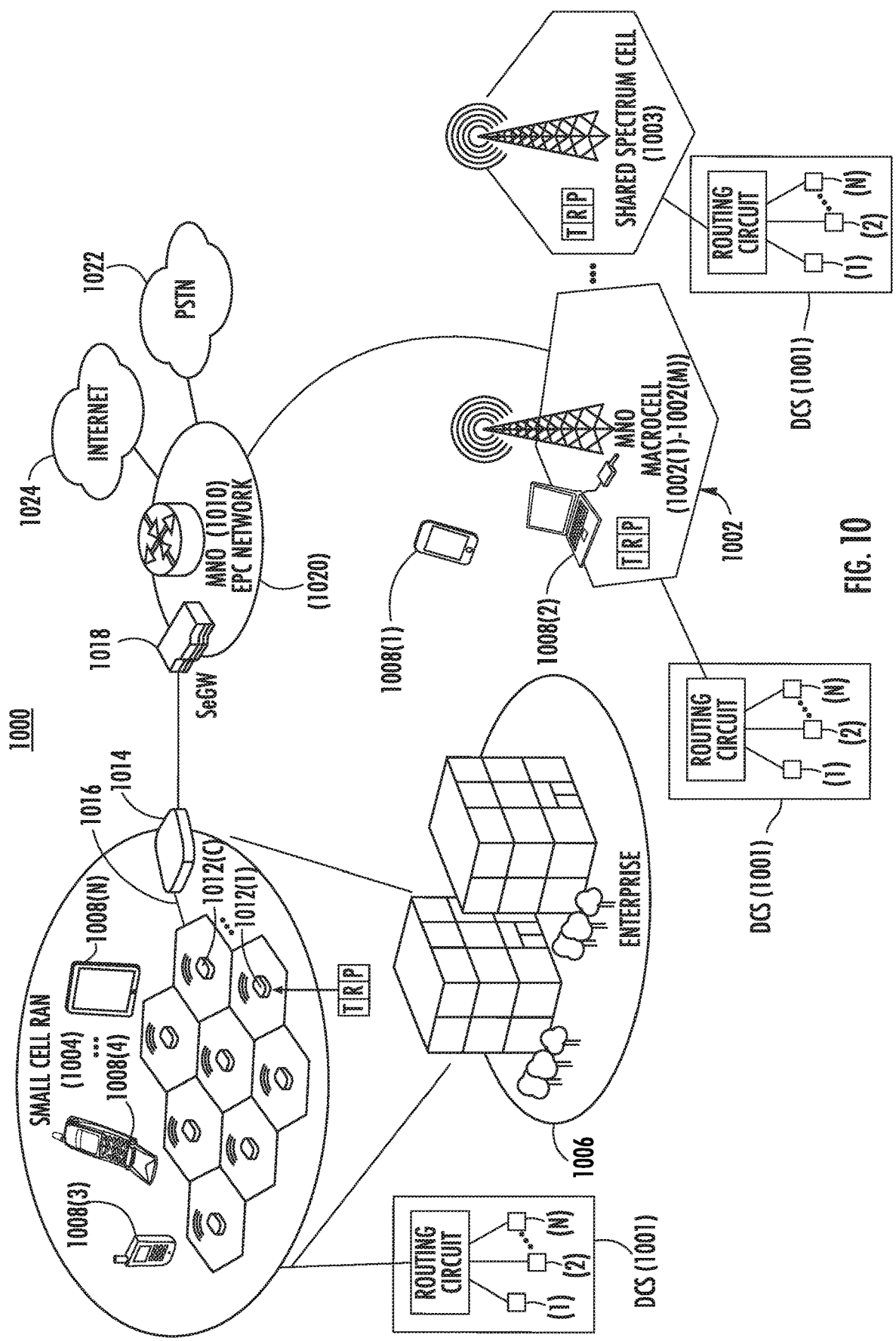
FIG. 10 is a schematic diagram of an exemplary mobile telecommunications environment that can includes the DCSs of FIGS. 4 and 7 for reducing the uplink accumulated noise floor.

The DCS 400 of FIG. 4 and the DCS 700 of FIG. 7 configured to reduce the uplink accumulated noise floor can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum DCSs 1001 supporting coordination of distribution of shared spectrum from multiple service providers to remote units to be distributed to subscriber devices. The shared spectrum DCSs 1001 can include the DCS 400 of FIG. 4, the DCS 700 of FIG. 7, and the WCS 800 of FIG. 8, as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between a user mobile communications device 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas the user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that a user mobile communications device 1008(3)-1008(N) may be able to be in communications range of two or more of the MNO macrocell 1002, the shared spectrum cell 1003, and the small cell RAN 1004 depending on the location of the user mobile communications devices 1008(3)-1008(N).

In FIG. 10, the mobile telecommunications environment 1000 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g, evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
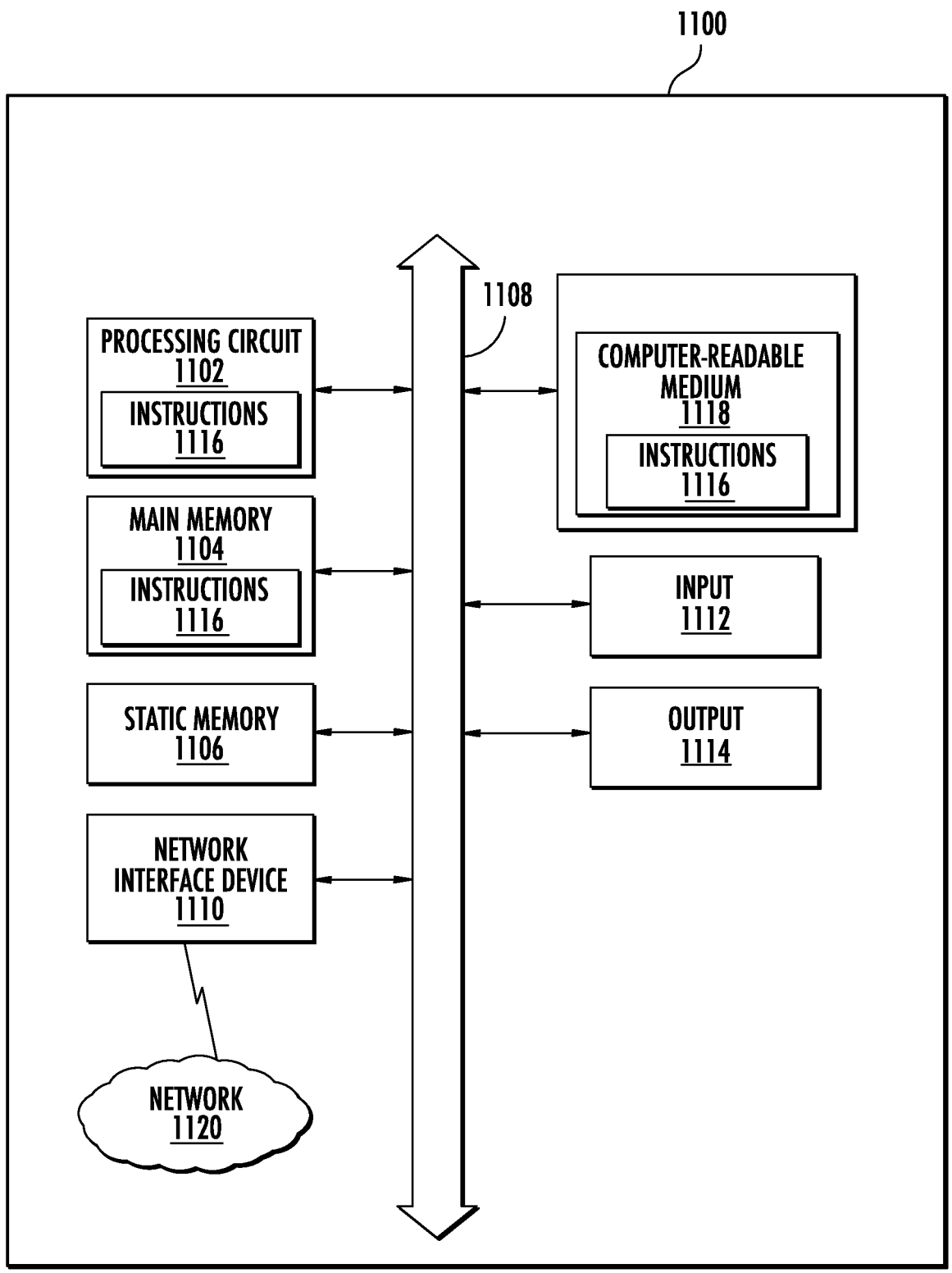
FIG. 11 is a schematic diagram of a representation of an exemplary computer system that can be included in or interfaced with any of the components in the DCSs of FIGS. 4 and 7 for reducing the uplink accumulated noise floor, wherein the exemplary computer system is configured to execute instructions from an exemplary computer-readable medium.

Any of the circuits in the DCS 400 of FIG. 4 and the DCS 700 of FIG. 7, such as the digital BBU 402, the DRU 404, the DRU 704, and/or the remote units 406(1)-406(N), can include a computer system 1100, such as that shown in FIG. 11, to carry out their functions and operations. With reference to FIG. 11, the computer system 1100 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1100 in this embodiment includes a processing circuit or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via a data bus 1108. Alternatively, the processing circuit 1102 may be connected to the main memory 1104 and/or static memory 1106 directly or via some other connectivity means. The processing circuit 1102 may be a controller, and the main memory 1104 or static memory 1106 may be any type of memory.

The processing circuit 1102 represents one or more general-purpose processing circuits such as a microprocessor, central processing unit, or the like. More particularly, the processing circuit 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1102 is configured to execute processing logic in instructions 1116 for performing the operations and steps discussed herein.

The computer system 1100 may further include a network interface device 1110. The computer system 1100 also may or may not include an input 1112 to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing circuit 1102 during execution thereof by the computer system 1100, the main memory 1104 and the processing circuit 1102 also constituting the computer-readable medium 1118. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

I claim:

1. A distributed communications system (DCS), comprising:
    a plurality of remote units coupled to a DRU and configured to generate a plurality of first uplink digital communications signals;
    a digital routing unit (DRU) configured to:
        receive the plurality of first uplink digital communications signals from the plurality of remote units; and
        generate a plurality of second uplink digital communications signals comprising the plurality of first uplink digital communications signals; and
    a baseband unit (BBU) comprising a plurality of receiver circuits coupled to the DRU via a plurality of communications mediums, respectively, and an uplink processing circuit coupled to the plurality of receiver circuits, the plurality of receiver circuits configured to:
        receive the plurality of second uplink digital communications signals from the DRU;
        decode the plurality of second uplink digital communications signals to generate a plurality of uplink digital communications signals; and
        decode the plurality of second uplink digital communications signals to generate the plurality of uplink digital communications signals each comprising a plurality of transport blocks (TBs) corresponding to one or more user equipment identifications, wherein the uplink processing circuit is configured to:
        receive the plurality of uplink digital communications signals from the plurality of receiver circuits, respectively; and
        generate an uplink digital communications signal comprising the plurality of TBs in each of the plurality of uplink digital communications signals arranged in a predefined protocol format.

2. The DCS of claim 1, wherein the DRU is configured to:
    receive the plurality of first uplink digital communications signals from the plurality of remote units, respectively;
    generate the plurality of second uplink digital communications signals comprising the plurality of first uplink digital communications signals; and
    provide each of the plurality of second uplink digital communications signals to a respective one of the plurality of receiver circuits via a respective one of the plurality of communications mediums.

3. The DCS of claim 1, wherein the DRU is further configured to:
    receive the plurality of first uplink digital communications signals from the plurality of remote units, respectively;
    generate the plurality of second uplink digital communications signals each comprising a respective one of the plurality of first uplink digital communications signals; and
    provide each of the plurality of second uplink digital communications signals to a respective one of the plurality of receiver circuits via a respective one of the plurality of communications mediums.

4. The DCS of claim 1, wherein the uplink processing circuit is further configured to process the plurality of TBs in each of the plurality of uplink digital communications signals to eliminate at least one duplicated TB associated with at least one user equipment identification.

5. The DCS of claim 1, wherein the BBU further comprises:
a medium access control (MAC) circuit coupled to the uplink processing circuit and configured to receive and convert the uplink digital communications signal into an upper layer uplink communications signal; and
an upper layer interface coupled to a signal source and configured to provide the upper layer uplink communications signal to the signal source.

6. The DCS of claim 5, wherein:
the upper layer interface is further configured to receive an upper layer downlink communications signal from the signal source;
the MAC circuit is further configured to convert the upper layer downlink communications signal into a downlink digital communications signal;
the BBU further comprises a transmitter circuit configured to provide the downlink digital communications signal to the DRU; and
the DRU comprises a splitter coupled to the plurality of remote units and is configured to:
split the downlink digital communications signal into a plurality of downlink digital communications signals each comprising the downlink digital communications signal; and
provide each of the plurality of downlink digital communications signals to a respective one of the plurality of remote units.

7. A distributed communications system (DCS), comprising:
a plurality of remote units coupled to a DRU and configured to generate a plurality of first uplink digital communications signals;
a digital routing unit (DRU) configured to:
receive the plurality of first uplink digital communications signals from the plurality of remote units; and
generate a plurality of second uplink digital communications signals comprising the plurality of first uplink digital communications signals; and
a baseband unit (BBU) comprising a plurality of receiver circuits coupled to the DRU via a plurality of communications mediums, respectively, the plurality of receiver circuits configured to:
receive the plurality of second uplink digital communications signals from the DRU; and
decode the plurality of second uplink digital communications signals to generate a plurality of uplink digital communications signals;
wherein the DRU is further configured to:
receive the plurality of first uplink digital communications signals from the plurality of remote units, respectively;
generate the plurality of second uplink digital communications signals each comprising one or more of the plurality of first uplink digital communications signals; and
provide each of the plurality of second uplink digital communications signals to a respective one of the plurality of receiver circuits via a respective one of the plurality of communications mediums; and
a plurality of remote unit clusters each comprising one or more of the plurality of remote units and configured to communicate the one or more of the plurality of first uplink digital communications signals to the DRU,
wherein the DRU comprises a plurality of combiners each coupled to a respective one of the plurality of remote unit clusters and configured to combine the one or more of the plurality of first uplink digital communications signals received from the respective one of the plurality of remote unit clusters into a respective one of the plurality of second uplink digital communications signals.

8. A method for reducing an uplink accumulated noise floor in a distributed communications system (DCS), comprising:
receiving, in a digital routing unit (DRU), a plurality of first uplink digital communications signals from a plurality of remote units;
generating, in the DRU, a plurality of second uplink digital communications signals comprising the plurality of first uplink digital communications signals;
receiving, from the DRU, the plurality of second uplink digital communications signals by a plurality of receiver circuits in a baseband unit (BBU); and
decoding the plurality of second uplink digital communications signals to generate a plurality of uplink digital communications signals;
in the DRU:
receiving the plurality of first uplink digital communications signals from the plurality of remote units, respectively;
generating the plurality of second uplink digital communications signals each comprising one or more of the plurality of first uplink digital communications signals; and
providing each of the plurality of second uplink digital communications signals to a respective one of the plurality of receiver circuits;
organizing the plurality of remote units into a plurality of remote unit clusters each comprising one or more of the plurality of remote units and configured to communicate the one or more of the plurality of first uplink digital communications signals to the DRU; and
in the DRU, combining the one or more of the plurality of first uplink digital communications signals received from the respective one of the plurality of remote unit clusters into a respective one of the plurality of second uplink digital communications signals.

9. The method of claim 8, further comprising, in the DRU:
receiving the plurality of first uplink digital communications signals from the plurality of remote units, respectively;
generating the plurality of second uplink digital communications signals comprising the plurality of first uplink digital communications signals; and
providing each of the plurality of second uplink digital communications signals to a respective one of the plurality of receiver circuits.

10. The method of claim 8, further comprising, in the DRU:
receiving the plurality of first uplink digital communications signals from the plurality of remote units, respectively;
generating the plurality of second uplink digital communications signals each comprising a respective one of the plurality of first uplink digital communications signals; and providing each of the plurality of second uplink digital communications signals to a respective one of the plurality of receiver circuits.

11. A method for reducing an uplink accumulated noise floor in a distributed communications system (DCS), comprising:

receiving, in a digital routing unit (DRU), a plurality of first uplink digital communications signals from a plurality of remote units;

generating, in the DRU, a plurality of second uplink digital communications signals comprising the plurality of first uplink digital communications signals;

receiving, from the DRU, the plurality of second uplink digital communications signals by a plurality of receiver circuits in a baseband unit (BBU);

decoding the plurality of second uplink digital communications signals to generate a plurality of uplink digital communications signals;

decoding the plurality of second uplink digital communications signals to generate the plurality of uplink digital communications signals each comprising a plurality of transport blocks (TBs) corresponding to one or more user equipment identifications;

receiving the plurality of uplink digital communications signals from the plurality of receiver circuits, respectively; and generating an uplink digital communications signal comprising the plurality of TBs in each of the plurality of uplink digital communications signals arranged in a predefined protocol format.

12. The method of claim 11, further comprising processing the plurality of TBs in each of the plurality of uplink digital communications signals to eliminate at least one duplicated TB associated with at least one user equipment identification.

13. The method of claim 11, further comprising:

receiving and converting the uplink digital communications signal into an upper layer uplink communications signal; and providing the upper layer uplink communications signal to a signal source.

14. The method of claim 13, further comprising:

receiving an upper layer downlink communications signal from the signal source;

converting the upper layer downlink communications signal into a downlink digital communications signal;

providing the downlink digital communications signal to the DRU;

splitting the downlink digital communications signal into a plurality of downlink digital communications signals each comprising the downlink digital communications signal; and providing each of the plurality of downlink digital communications signals to a respective one of the plurality of remote units.

* * * * *